United States Patent [19]

Saleman

[11] Patent Number: 5,148,625
[45] Date of Patent: Sep. 22, 1992

[54] ROACH TRAP

[76] Inventor: Walter M. Saleman, 840 The Rialto, Venice, Fla. 34285

[21] Appl. No.: 863,845

[22] Filed: Apr. 6, 1992

[51] Int. Cl.⁵ .................. A01M 23/20; A01M 1/10
[52] U.S. Cl. ............................... 43/121; 43/61; 43/107; 43/67
[58] Field of Search .............. 43/107, 121, 61, 67

[56] References Cited

U.S. PATENT DOCUMENTS

| | | | |
|---|---|---|---|
| 1,186,408 | 6/1916 | Knights | 43/61 |
| 2,736,984 | 3/1956 | Deane | 43/61 |
| 4,232,472 | 11/1980 | Muelling | 43/67 |
| 4,462,181 | 7/1984 | Broman | 43/61 |
| 4,682,441 | 7/1987 | Straver | 43/61 |
| 4,829,700 | 5/1989 | Ha | 43/61 |
| 5,005,313 | 4/1991 | Lindros | 43/61 |

FOREIGN PATENT DOCUMENTS 731295   5/1932   France ................... 43/67

Primary Examiner—Kurt Rowan
Attorney, Agent, or Firm—Charles J. Prescott

[57] ABSTRACT

A roach trap structured for capturing one or more roaches as a piece of bait is being consumed within the trap. A hinged lid is held in an open position by interconnection to or against the bait, which is rigid and preferably a peanut half. The bait is held in position within a preferably tapered bait aperture formed in an interior partition by either a rod pivotally connected to the lid and pressing against the bait with the distal end of the rod or a length of flexible string connected at one end to the lid and tied around and pulling against the bait at the other end thereof. Because the lid will only drop to a closed position after a portion of the bait has been consumed and finally passes through the bait aperture, the device will capture many roaches at a time which have entered to eat the bait. The device is also transparent for easy viewing of captured prey.

13 Claims, 2 Drawing Sheets

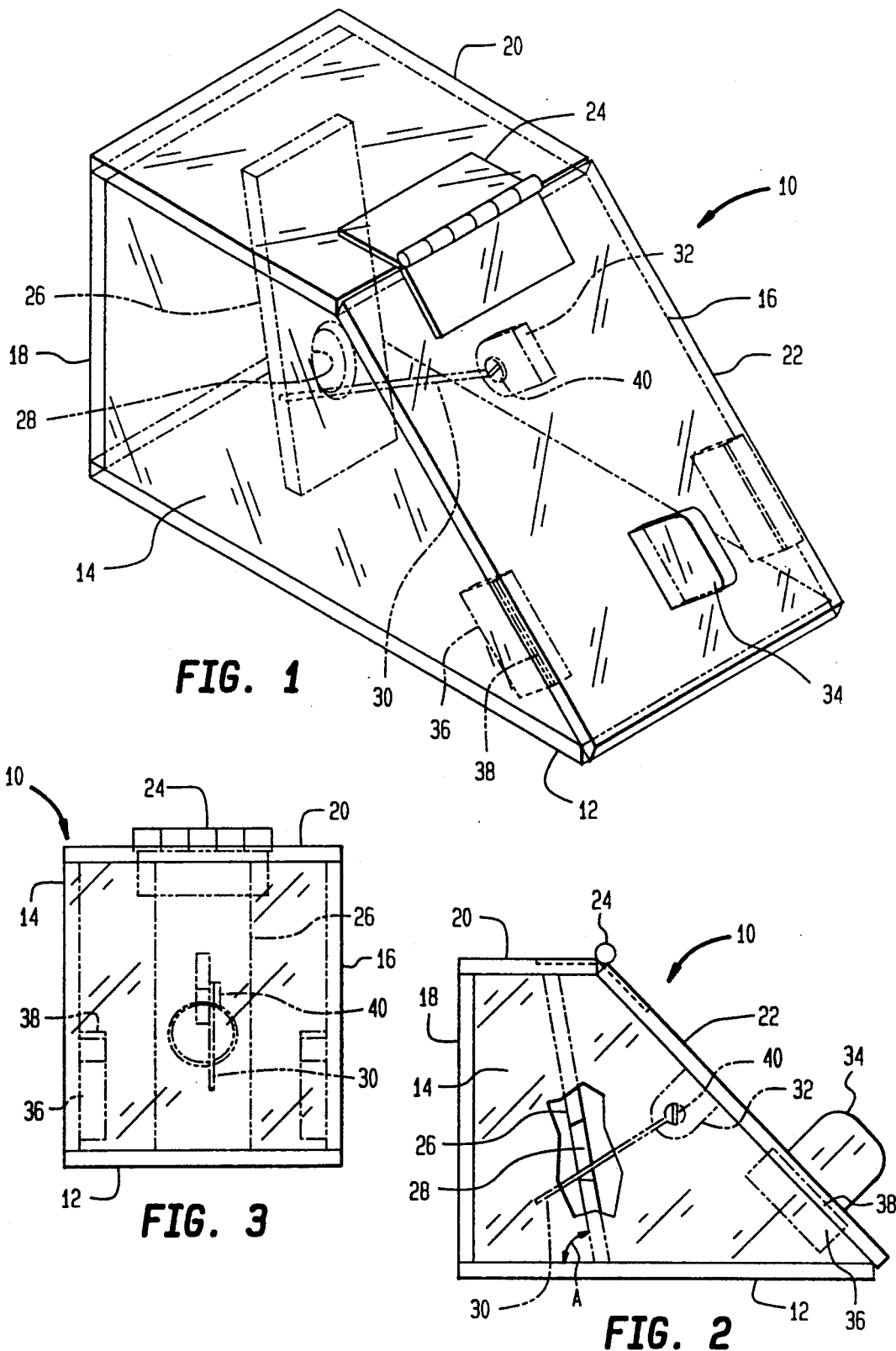

ROACH TRAP

BACKGROUND OF THE INVENTION

This invention relates generally to means for eliminating roaches, and more particularly to a roach trap having a unique consumable bait supporting triggering mechanism.

Removal of roaches from the interior of buildings has drawn significant attention in the past. One main approach to roach removal is to the use of chemicals and pesticides which are either sprayed or disbursed within the building interior where the roaches are found. However, this approach has produced considerable deleterious effects upon humans and pets which also reside within the building.

A product under the trademark ROACH MOTEL has also been marketed which attempts to entrap the roaches within a box open at each end by a sticky surface within the device which is then later disposed of with roaches adherently trapped therewithin. However, these devices appear to function less than fully effectively for the purpose.

A number of prior art devices are also known to applicant for trapping rodents as follows:

| Hunter | 4,179,835 |
| --- | --- |
| Beard | 4,583,317 |
| Straver | 4,682,441 |
| Brubaker, Jr. | 4,310,984 |
| Muelling | 4,232,472 |
| Hunter | 4,682,440 |
| Wyant | 4,162,588 |
| VanKuren | 3,113,395 |
| Gilbaugh | 4,080,749 |

However, not only are these inventions directed to the trapping of rodents, as opposed to roaches, and therefore inappropriately large, they are also structured to capture only one rodent at a time.

The present invention is provided to entrap a number of roaches therewithin which are consuming a piece of bait. As the bait is consumed and reaches a certain reduced size, it then passes through a bait support aperture, thus triggering the lid to fall to a closed position. The bait utilized is rigid and preferably a peanut half because of its size and structure and the attractiveness of the peanut odor as food for roaches.

BRIEF SUMMARY OF THE INVENTION

This invention is directed to a roach trap structured for capturing one or more roaches as a piece of bait is being consumed within the trap. A hinged lid is held in an open position by interconnection to or against the bait, which is rigid and preferably a peanut half. The bait is held in position within a preferably tapered bait aperture formed in an interior partition by either a rod pivotally connected to the lid and pressing against the bait with the distal end of the rod or a length of flexible string connected at one end to to the lid and tied around and pulling against the bait at the other end thereof. Because the lid will only drop to a closed position after a portion of the bait has been consumed and finally passes through the bait aperture, the device will capture many roaches at a time which have entered to eat the bait. The device is also transparent for easy viewing of captured prey.

It is therefore an object of this invention to provide a reusable roach trap which will capture a plurality of roaches therewithin for disposal.

It is yet another object of this invention to provide a roach trap utilizing a peanut half as bait which, when partially consumed, will then trigger the closing of the lid to capture roaches contained therewithin.

It is yet another object of this invention to preferably provide a transparent roach trap which facilitates viewing of the contents trapped therewithin.

It is yet another object of this invention to provide a roach trap which is easily washable and of sufficiently small size so as to be placed in tight quarters within the building where roaches normally travel.

In accordance with these and other objects which will become apparent hereinafter, the instant invention will now be described with reference to the accompanying drawings.

BRIEF DESCRIPTION OF THE DRAWINGS

FIG. 1 is a perspective view of the preferred embodiment of the invention. FIG. 2 is a side elevation view of FIG. 1. FIG. 3 is a left end elevation view of FIG. 2.

DETAILED DESCRIPTION OF THE INVENTION

Figure 4:
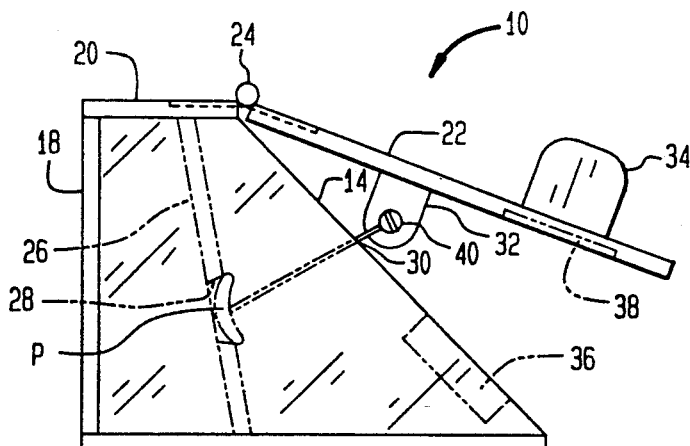
FIG. 4 is a view similar to FIG. 2 with the lid in its open, armed position.

Referring now to the drawings, and particularly to FIGS. 1 to 3, the preferred embodiment of the invention is there shown at numeral 10 and includes a flat transparent bottom panel 12, side transparent upright panels 14 and 16, a transparent end panel 18 and a transparent top panel 20. These panels are connected at mating edge surfaces by instant adhesive or the like. A transparent lid 22 is hinge connected by hinge 24 to the exposed unsupported margin of top panel 20 as shown.

The exposed, unsupported margin of bottom panel 12, side panels 14 and 16 and top panel 20 define a rectangular opening onto which lid 22 conforms in size and shape so that, when lid 22 is in its closed position as shown in FIG. 1, the opening is sealed, enclosing the interior volume defined by the device 10.

A transparent partition 26 is connected in generally upright position between the bottom and top panels 12 and 20, respectively. This partition 26 includes a bait supporting aperture 28 formed centrally therethrough as shown. This aperture 28 is beveled rearwardly as seen in FIG. 2. The preferred orientation of partition 26 is at an oblique angle A with respect to bottom 12 which is in the range of about 70 to 80 degrees. Note that partition 26 is narrower than the width of the device 10 to allow a roach to feed on the peanut half P from either side thereof.

A slender rigid rod 30 is loosely pivotally connected by screw 40 to a tab 32 connected to the lower surface of lid 22 as shown. The rod 30 is sized so as to pass through aperture 28 when lid 22 is in its closed position.

To assist gravity in securing lid 22 in its closed position, a pair of small magnets 36 are connected to the inner surfaces of side panels 14 and 16 immediately adjacent the unsupported margins thereof and attract metal plates 38 connected to the corresponding surface of lid 22. To assist in opening lid 22, a handle 34 upwardly disposed from the upper surface of lid 22 is also provided.

Referring additionally to FIG. 4, the device 10 in its triggered or armed configuration is there shown. A peanut half P is positioned within aperture 28 as shown. It may now be appreciated that the rearwardly beveling of aperture 28 is such as to facilitate the nesting of the peanut half P therewithin, yet to prohibit the peanut half P from passing therethrough when so positioned.

After positioning the peanut half P within aperture 28 as shown in FIG. 4, rod 30 is pivoted about fastener 40 so that the distal end of rod 30 presses against peanut half P. The weight of lid 22 then pivotally acts about hinge 24 and through rod 30 to hold the peanut half P in position.

As roaches enter into the interior volume of the device 10, particularly attracted there by the scent of the peanut half P, they begin to consume this bait. When the peanut half P has been sufficiently consumed, it will pass through aperture 28, immediately followed by rod 30 which simultaneously closes lid 22. This sequence of events is sufficiently instantaneous so as to trap all roaches which have entered to dine.

To dispose of roaches captured within the device 10, the user simply grasps handle 34 to open lid 22 and then shakes the contents into a suitable area outside of the building or other appropriate disposal location.

Figure 5:
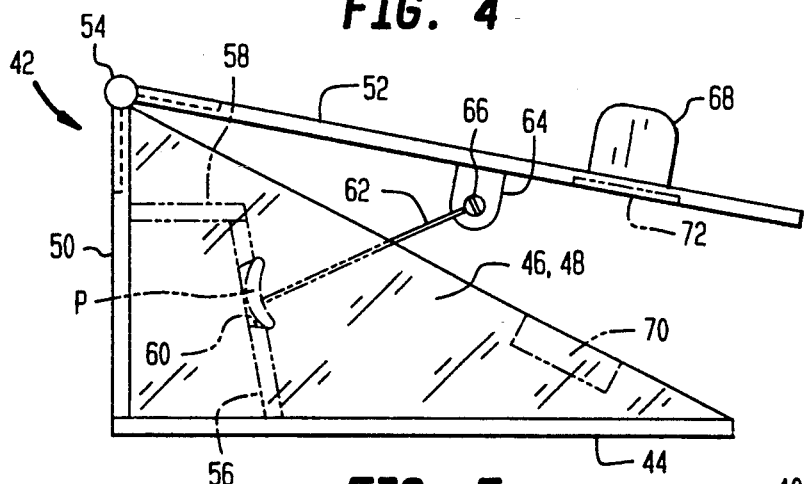
FIG. 5 is a view similar to FIG. 4 depicting another embodiment of the invention.

Referring now to FIG. 5, an alternate embodiment of the invention is there shown at numeral 42 which is similar in nature and function to that previously described except that the top panel has been eliminated. This device 42 includes a transparent bottom panel 44, upright side panels 46 and 48 and end panel 50, formed of transparent plastic material as previously and connected by instant adhesive or the like. A lid 52 is hinge connected by hinge 54 to the unsupported margin of end panel 50.

The device 42 also includes a two-part partition formed of connected members 56 and 58, member 56 including a bait aperture 60 as previously described for supporting a peanut half P or other rigid bait sized appropriately. Rod 62, hingedly connected to tab 64 by fastener 66, functions as previously described. Magnet 70, acting with metal plate 72, is also provided in this embodiment 42 in a fashion similar to that shown and described in FIG. 1.

Figure 6:
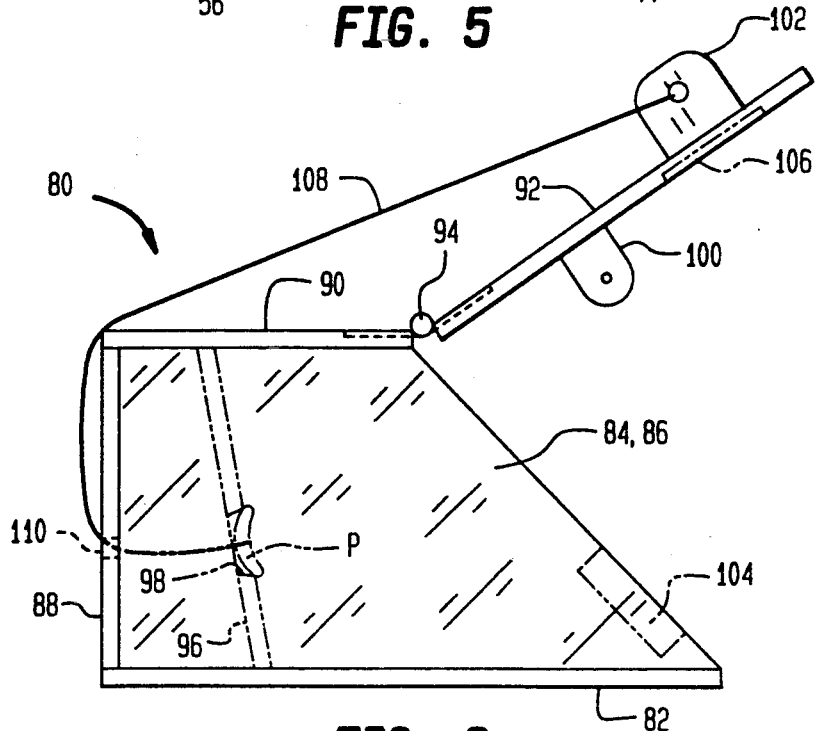
FIG. 6 is a view similar to FIG. 4 depicting yet another embodiment of the invention.

Referring lastly to FIG. 6, another alternate embodiment of the invention is shown generally at numeral 80. This embodiment 80 is armed with its lid 92 in the open position by interconnection of a thin, flexible length of thread 108 to a hole through handle 102 at one end and tied around a peanut half P at the other end of thread 108. Thread 108 passes through an aperture 110 formed centrally in end panel 88 to enter the interior of the device 80 for tying securement around peanut half P.

This embodiment 80 also is fabricated of a transparent bottom panel 82, upright side panels 84 and 86, end panel 88 and top panel 90. Lid 92 is hingedly connected at hinge 94 to the unsupported margin of top panel 90. Magnets 104 connected to side panels 84 and 86 as shown act with metal plate 106 connected to lid 92 to secure the lid 92 in its closed position. Tab 100 is provided to be connectable to a slender rigid rod as previously described should the thread 102 become worn or otherwise not preferred.

Again, all of the embodiments of the invention are formed of transparent sheet plastic material for economy and are adhered at their joints with instant adhesive or the like. However, within the scope of this invention, any of the roach traps described herein may also be integrally molded of plastic, except for their lids which are structured separately for free hinged connection and may be translucent or opaque in their entirety or selected panels thereof.

While the instant invention has been shown and described herein in what are conceived to be most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A roach trap for confining one or more roaches for disposal comprising:
   a housing having flat panels connected along edge margins to form sides, an end, a bottom and a top which define an interior volume;
   said top smaller in length than said bottom;
   said sides, top and bottom each having an unsupported edge, said edges collectively defining an opening;
   said opening oblique to said bottom;
   a lid hinge connected at one end to said top unsupported edge and sized to conform to said opening when closed by gravity thereagainst in a manner preventing a roach from escaping from the interior of said roach trap;
   a partition connected in the interior of said roach trap having a generally upright bait support aperture formed therethrough, said aperture having tapered side walls whereby a rigid piece of bait such as a peanut may be inserted partially into, but not through, said aperture;
   a slender elongated means for supporting said lid in an open position above said opening a distance sufficient for a roach to enter into the interior of said roach trap, one end of said lid support means connected to said lid, the opposite end of said lid support means held from movement by contact with the bait positioned within said aperture, the weight of said lid acting through said lid support means against the bait to maintain said lid in its open position;
   said lid being dropped to its closed position sealing said opening when the roach consumes a sufficient portion of the bait to allow the bait portion remaining in contact with the opposite end of said lid support means to pass through said aperture.

2. A roach trap as set forth in Claim 1, wherein:
   said lid support means includes a slender rigid rod pivotally connected at one end to, and extending below, said lid;
   said rod sized in length to contact and be supported at a distal end thereof by the bait when positioned in said aperture whereby said lid is held in the open position.

3. A roach trap as set forth in claim 1, wherein:
   said lid support means includes a length of flexible thread connected at one end to, and extending above, said lid;
   a hole formed through said end, said hole facing said aperture;
   said thread sized in length to be drawn across the exterior of said top and downwardly to and through said hole into the interior of said roach trap and through said aperture, whereupon a distal end of said thread is connectable by tying around the bait;

said lid being supported in the open position when the bait, with said thread distal end secured thereto, is positioned in said aperture.

4. A roach trap as set forth in claim 1, wherein:

said partition is oblique with respect to said bottom at an angle in the range of about 70-80 degrees.

5. A roach trap as set forth in claim 1, further comprising:

magnetic means connected between said lid and said opening for further securing said lid in the closed position against said opening.

6. A roach trap as set forth in claim 1, wherein:

said housing and said lid are transparent.

7. A roach trap as set forth in claim 1, wherein:

said partition is narrower in width than said bottom.

8. A roach trap for confining one or more roaches for disposal comprising:

a housing having flat panels connected along edge margins to form sides, an end and a bottom which define an interior volume;

said sides, bottom and end each having an unsupported edge, said edges collectively defining an opening;

said opening oblique to said bottom;

a lid hinge connected at one end to said end unsupport edge and sized to conform to said opening when closed by gravity thereagainst in a manner preventing a roach from escaping from the interior of said roach trap;

a partition connected in the interior of said roach trap having a generally upright bait support aperture formed therethrough, said aperture having tapered side walls whereby a rigid piece of bait such as a peanut may be inserted partially into, but not through, said aperture;

a slender elongated means for supporting said lid in an open position above said opening a distance sufficient for a roach to enter into the interior of said roach trap, one end of said lid support means connected to said lid, the opposite end of said lid support means held from movement by contact with the bait positioned within said aperture, the weight of said lid acting through said lid support means against the bait to maintain said lid in its open position;

said lid being dropped to its closed position sealing said opening when the roach consumes a sufficient portion of the bait to allow the bait portion remaining in contact with the opposite end of said lid support means to pass through said aperture.

9. A roach trap as set forth in claim 8, wherein:

said lid support means includes a slender rigid rod pivotally connected at one end to, and extending below, said lid;

said rod sized in length to contact and be supported at a distal end thereof by the bait when positioned in said aperture whereby said lid is held in the open position.

10. A roach trap as set forth in claim 8, wherein:

said partition is oblique with respect to said bottom at an angle in the range of about 70-80 degrees.

11. A roach trap as set forth in claim 8, further comprising:

magnetic means connected between said lid and said opening for further securing said lid in the closed position against said opening.

12. A roach trap as set forth in claim 8, wherein:

said housing and said lid are transparent.

13. A roach trap as set forth in claim 8, wherein:

said partition is narrower in width than said bottom.

* * * * *